United States Patent Office 3,465,006
Patented Sept. 2, 1969

3,465,006
POLYHALO - SUBSTITUTED POLYHYDROMETH-ANONAPHTHALENEDICARBOXYLIC ACIDS OR ANHYDRIDES THEREOF
Louis Schmerling, Riverside, Ill., assignor to Universal Oil Products Company, Des Plaines, Ill., a corporation of Delaware
No Drawing. Continuation-in-part of application Ser. No. 408,650, Nov. 3, 1964. This application Nov. 8, 1968, Ser. No. 774,496
Int. Cl. C07d 5/38, 5/32
U.S. Cl. 260—346.6        7 Claims

ABSTRACT OF THE DISCLOSURE

Polyhalo-substituted polyhydromethanonaphthalenedicarboxylic acids or anhydrides thereof, as exemplified by 1,4,5,6,7,8,9,9-octachloro - 1,2,3,4,4a,5,8,8a - octahydro-5,8-methano-2,3-naphthalenedicarboxylic acid, are prepared by condensing furan with maleic acid, further condensing the resultant 3,6-epoxy-1,2,3,6-tetrahydrophthalic acid with a halo-substituted cyclopentadiene, and treating the resulting compound with hydrogen halide to attach halogens to each of the carbon atoms which originally held the epoxy oxygen. These compounds are useful as components of plastics or resins whereby flame retardant or flame resistant properties are added thereto.

---

This application is a continuation-in-part of my copending application, Ser. No. 408,650, filed Nov. 3, 1964, now abandoned.

This invention relates to novel compositions of matter comprising polyhalo-substituted polyhydromethanonaphthalenedicarboxylic acids or anhydrides thereof which are useful to impart desirable physical characteristics to polymeric compositions of matter such as resins, plastics, synthetic or naturally occurring textiles, etc.

In the past relatively few years the use of certain polymeric compositions of matter such as plastics and resins has increased to a great degree. In view of the fact that these plastics or resins are replacing materials heretofore used in certain places involving an excessive amount of heat and possible exposure to flame, it is necessary that these synthetic compounds possess the capability of being able to withstand the aforementioned effects of heat and/or flame. For example, in recent years plastics and resins have been used in architectural paneling, electrical appliances and equipment, and in other places where the possibility of contact with an open flame is present. These synthetic materials must therefore possess the desirable physical characteristics of being resistant to flame or retardant to the action of the flame thereon. In addition to the use of these compounds in positions susceptible to flames, plastics and resins have also been used as acoustical sound deadeners in walls or ceilings, as bodies for airplanes, automobiles and boats and for many other uses too numerous to mention at this time, in all of the aforementioned uses the desirable characteristic of flame retardancy being a desirable characteristic of the synthetic materials.

The novel compositions of matter of the present invention will, as hereinbefore set forth, be useful as additives to or components of plastics, polymers, co-polymers, resins, elastomers, rubbers, textiles, and fibers, both naturally occurring and synthetic in nature such as cotton, wool, nylon, Dacron, etc., coatings, paints, varnishes, leather, foams, polyolefins such as polyethylene and polyethylene co-polymers, polypropylene and polypropylene co-polymers, polystyrene, polyesters, polyurethane, polyphenyl ethers (polyphenylene oxides), polycarbonates, polyamides, polyoxymethylenes, polyalkylene oxides such as polyethylene oxide, polyacrylates, polymethacrylates, epoxy resins, acrylonitrile-butadiene-styrene formulations (commonly known as ABS), etc., whereby the desirable physical characteristics of flameproofing or fire retardancy will be imparted to the aforementioned materials. In addition, compounds, when utilized as a substituent of paint, lacquer, varnishes or protective coatings, films, etc. will also impart a flame retardancy to these compounds and, therefore, render them commercially attractive as articles of commerce. Also, besides imparting the desirable physical characteristics of flame retardancy to the various articles of manufacture, the additives or components will render certain polymeric compositions of matter more stable to color changes and, therefore, will be important components of these compounds whenever it is desirable that discoloration of the finished product is to be avoided or will tend to render such articles unusable.

It is therefore an object of this invention to provide novel compositons of matter which possess desirable physical characteristics.

Another object of this invention is to provide novel compositions of matter which, when utilized as a component of polymeric compositions of matter, will impart desirable physical characteristics such as flame retardancy to the finished product.

In one aspect an embodiment of this invention resides in a polyhalo-substituted polyhydromethanonaphthalenedicarboxylic acid or anhydride thereof having the formula:

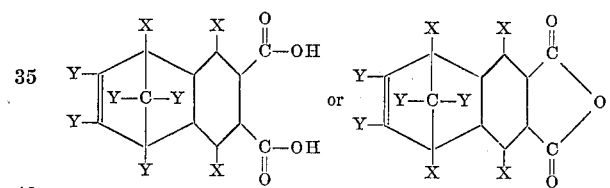

in which X is halogen and Y is hydrogen or halogen, the preferred halogen substituents of both X and Y being chlorine and bromine.

A specific embodiment of this invention is found in a novel composition of matter comprising 1,4,5,6,7,8,9,9-octachloro - 1,2,3,4,4a,5,8,8a - octahydro - 5,8 methano-2,3-naphthalenedicarboxylic anhydride.

Other objects and embodiments will be found in the following further detailed description of the present invention.

As hereinbefore set forth, the present invention is concerned with novel compositions of matter which may be generically referred to as halogenated derivatives of polycyclicdicarboxylic acids, these compounds being useful as additives to or components of plastics, resins, polymers, etc. The acids or anhydrides thereof which constitute the novel compositions of matter are obtained in a three-step process. The first step of the process involves the reaction of a furan with an unsaturated or olefinic dibasic acid or anhydride thereof. While the preferred heterocyclic compound comprises furan, it is also contemplated within the scope of this invention that substituted furans including alkyl and halogenated derivatives thereof such as 2-methylfuran, 2-ethylfuran, 2-chlorofuran, 2,5-dichlorofuran, 2-bromofuran, 2,5-dibromofuran, etc. may also be used, although not necessarily with equivalent results. Generally speaking, the presence of alkyl groups in the 2,5-positions of the furan ring is often less desirable due to their effect on the final step in this process. Examples of unsaturated dibasic acids or anhydrides thereof, also referred to as olefinic dicarboxylic acids or anhydride acid derivatives in the present specification, which may be used include maleic acid, maleic anhydride, fumaric acid, itaconic acid, citraconic acid, glutaconic acid, mesaconic acid, ethylidenemalonic acid, vinylmalonic acid, allylmalonic acid, propylidenemalonic acid, hydromuconic acid, pyrocinchonic acid, vinylsuccinic acid, allylsuccinic acid, et. For purposes of the present specification, the term "olefinic dicarboxylic acid and anhydride thereof" will refer to a dicarboxylic compound containing only one ethylenic double bond and comprising only carbon, hydrogen, and oxygen atoms. The aforementioned furan and unsaturated or olefinic dicarboxylic acid or anhydride thereof are condensed at temperatures ranging from about 0° up to about 200° C. or more, and preferably in a range of from about 25° to about 100° C. The two starting materials can be mixed per se, or, if so desired, solutions of the starting materials in substantially inert organic solvents such as n-pentane solutions, n-hexane solutions, benzene solutions, toluene solutions, ether solutions, alcohol solutions, etc. may be admixed.

The product resulting from the aforementioned condensation, namely, an epoxy tetrahydrophthalic acid or an anhydride or homolog thereof, is then further condensed with a halo-substituted cycloalkadienic compound to form the desired reaction product. For purposes of this invention, the term "halocycloalkadine" as used in the specification will refer to both mono- and poly-halo-substituted conjugated cycloalkadienes. Examples of the halo-substituted cycloalkadienes which may be used in the process of this invention includes chloro-substituted 1,3 - cyclopentadienes (hereinafter referred to as cyclopentadienes) such as 1-chlorocylopentadiene,
2-chlorocyclopentadiene,
1,2-dichlorocyclopentadiene,
1,5-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene;

bromo-substituted cyclopentadines such as 1-bromocyclopentadiene,
1,2-dibromocyclopentadiene,
1,2,3-tribromocyclopentadiene,
1,2,3,4-tetrabromocyclopentadiene,
1,2,3,4,5-pentabromocyclopentadiene,
hexabromocyclopentadiene;

chloro-substituted 1,3-cyclohexadines (hereinafter referred to as cyclohexadines) such as 1-chlorocyclohexadiene,
1,2-dichlorocyclohexadiene,
1,3-dichlorocyclohexadiene,
4,5-dichlorocyclohexadiene,
4,6-dichlorocyclohexadiene,
1,2,3-trichlorocyclohexadiene,
1,2,4-trichlorocyclohexadiene,
1,2,3,4-tetrachlorocyclohexadiene,
pentachlorocyclohexadiene,
hexachlorohexadiene,
octachlorocyclohexadiene;

bromo-substituted cyclohexadienes such as 1-bromocyclohexadiene,
1,2-dibromocyclohexadiene,
1,3-dibromocyclohexadiene,
4,5-dibromocyclohexadiene,
4,6-dibromocyclohexadiene,
1,2,3-triboromocyclohexadiene,
1,2,4-tribromocyclohexadiene,
1,2,3,4-tetrabromocyclohexadiene,
pentabromocyclohexadiene,
hexabromocyclohexadiene,
octabromocyclohexadiene, the corresponding polyfluoro and polyiodo-substituted 1,3-cyclopentadienes, 1,3-cyclohexadienes, etc., the preferred compounds being those which contain chloro or bromo-substituents. In addition, it is also contemplated within the scope of this invention that the cyclopentadienes and cyclohexadienes containing more than one species of halogen substituents may also be used, although not necessarily with equivalent results, such compounds including 1-chloro-2-bromocyclopentadiene,
1,2-dichloro-5,5-dibromocyclopentadiene,
2,3-dichloro-5,5-dibromocyclopentadiene,
1-chloro-2-bromocyclohexadiene,
1,2-dichloro-3-bromocyclohexadiene,
1,2-dichloro-3,4-dibromocyclohexadiene, etc.

The condensation reaction between the epoxy tetra hydrophthalic acid, anhydride or homolog thereof and the halo-substituted cycloalkadiene is of the Diels-Alder type and may be effected at elevated temperatures in the range of from about 50° to about 250° C., the preferred range being from about 100° to about 200° C. In addition, pressures ranging from atmospheric up to about 100 atmospheres or more may be used, the pressure being sufficient so as to maintain a major portion of the reactants and solvents in the liquid phase. If so desired, this condensation may be effected in the presence of an inert organic solvent including aromatic solvents such as benzene, toluene, o-xylene, m-xylene, p-xylene, ethylbenzene, etc.; saturated paraffins and cycloparaffins such as n-pentane, n-hexane, n-heptane, cyclopentane, methylcyclopentane, cyclohexane, cycloheptane, etc.; low molecular weight alcohols such as methyl alcohol, ethyl alcohol, propyl alcohol, isopropyl alcohol, butyl alcohol, etc.; ethers such as dimethyl ether, diethyl ether, dipropyl ether, etc.; or acetone, acetic acid, etc., the aromatic solvents usually comprising the preferred solvents.

The halo - substituted polyhydroepoxymethanonaphthalenedicarboxylic acid or anhydride thereof which is prepared according to the above paragraph is then treated with a hydrogen halide in either gaseous or liquid form. Examples of these acidic compounds include hydrogen chloride, hydrogen bromide, hydrogen fluoride, hydrogen iodide, hydrochloric acid, hydrobromic acid, hyrofluoric acid, hydriodic acid. When the finished product constitutes an anhydride it is desirable to utilize the hydrogen halide in anhydrous form. The treatment of the halo-substituted polyhydromethanonaphthalenedicarboxylic acid or anhydride thereof with the hydrogen halide may be effected at temperatures ranging from about room temperature (25° C.) up to about 125° C. or more.

As a specific illustration of the aforementioned steps hereinbefore described in which one of the novel compositions of matter of the present invention is prepared, the process is set forth below in equation form wherein furan and maleic anhydride are utilized as the starting materials in a typical condensation reaction, thereafter treating the first condensation product with hexachlorocyclopentadiene and thereafter treating the resultant product with hydrochloric acid to form 1,4,5,6,7,8,9,9-octachloro - 1,2,3,4,4a,5,8,8a - octahydro-5,8-methano-2,3-naphthalenedicarboxylic acid.

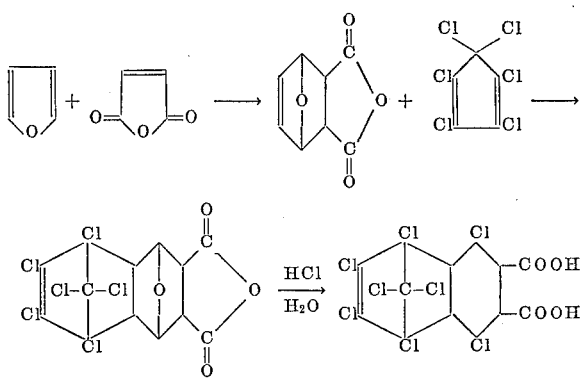

Under some conditions, particularly when a 2,5-disubstituted furan is used, the final step may result in the elimination of hydrogen chloride resulting in a less hydrogenated product. Thus, use of 2,5-dimethylfuran or 2,5-dichlorofuran will yield some I (1,4-dimethyl-5,6,7,8,9,9-hexachloro-4a,5,8,8a-tetrahydro-5,8-methano - 2,3 - naphthalenedicarboxylic acid) and II (1,4,5,6,7,8,9,9-octachloro - 4a,5,8,8a-tetrahydro-5,8-methano-2,3-napthalenedicarboxylic acid), respectively.

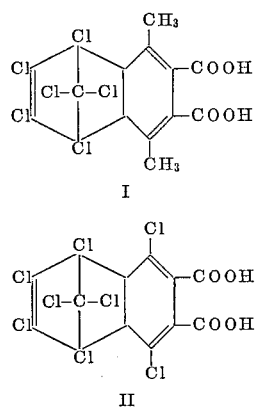

The process for preparing the novel compositions of matter of the present invention may be effected in any suitable maner and may comprise either a batch or continuous type operation. For example, when a batch type operation is used, a quantity of the furan and the olefinic dicarboxylic acid or anhydride thereof is placed in an appropriate apparatus, preferably a condensation vessel, at the proper operating conditions of temperature and allowed to condense. Following this, the epoxy tetrahydrophthalic acid or anhydride is recovered by conventional means such as fractional distillation, crystallization, etc. and placed in a second condensation apparatus along with a halo-substituted cycloalkadiene, this condensation being effected in the presence of an inert organic solvent. The condensation vessel is heated to the desired temperature, and after a predetermined residence time, the vessel is cooled and the halo-substituted polyhydroepoxymethanonaphthalenedicarboxylic acid or anhydride thereof is separated from the unreacted starting materials by conventional means and recovered. This product is then treated with a hydrogen halide in an appropriate vessel at temperatures ranging from about 50° to about 100° C. and the desired product, after completition of the desired residence time, is recovered.

It is also contemplated that the novel compositions of matter of the present invention may be prepared by a process which is effected in a continuous manner. When such type of operation is used, the starting materials comprising the furan and the olefinic dicarboxylic acid or anhydride thereof are continuously charged to a reaction vessel which is maintained at the proper operating conditions of temperature and pressure. If so desired, this reaction may be effected in the presence of an inert organic solvent such as a low molecular weight ether or alcohol. The resultant epoxy tetrahydrophthalic anhydride is continuously withdrawn from the reaction vessel and charged to a second condensation vessel which is also maintained at the proper operating conditions of temperature and pressure. In addition, the halo-substituted cycloalkadiene is continuously charged to this second reaction vessel which is maintained at the proper operating conditions of temperature and pressure through a separate line. Alternatively, the halo-substituted cycloalkadiene may be admixed with an inert organic solvent, thereafter further admixed with the epoxy tetrahydrophthalic anhydride and the mixture charged to the reactor in a single stream. The resultant halo-substituted polyhydroepoxymethanonaphthalenedicarboxylic acid or anhydride is continuously withdrawn and charged to a treating vesel wherein it undergoes treatment with a hydrogen halide of the type hereinbefore set forth in greater detail at temperatures ranging from 50° to about 100° C. The reactor effluent is continuously withdrawn from this vessel and charged to a separator wherein the desired product comprising the halo - substituted polyhydromethanonaphthalenedicarboxylic acid is separated from unreacted starting materials and recovered. It is to be understood that in a continuous process of this type in each case the reactor effluent from the first and second condensation zones, as well as the third treating zone, is subjected to a separation step wherein the desired product from each zone is separated from the unreacted starting materials in each step, the latter being recycled to form a portion of the feed stock to each respective reaction zone.

Examples of halo-substituted polyhydromethanonaphthalenedicarboxylic acids which are prepared according to the process of this invention include 1,4,5,8-tetrachloro-1,2,3,4,4a,5,8,8a-octahydro-5,8-methano-2,3-naphthalenedicarboxylic acid,
1,4-dichloro-5,8-dibromo-1,2,3,4,4a,5,8,8a-octahydro-5,8-methano-2,3-naphthalenedicarboxylic acid,
1,4,5,6,7,8-hexachloro-1,2,3,4,4a,5,8,8a-octahydro-5,8-methano-2,3-naphthalenedicarboxylic acid,
1,4,5,6,7,8,9,9-octachloro-1,2,3,4,4a,5,8,8a-octahydro-5,8-methano-2,3-naphthalenedicarboxylic acid,
1,4-dichloro-5,6,7,8-tetrabromo-1,2,3,4,4a,5,8,8a-octahydro-5,8-methano-2,3-naphthalenedicarboxylic acid,
1,4-dichloro-5,6,7,8,9,9-hexabromo-1,2,3,4,4a,5,8,8a-octahydro-5,8-methano-2,3-naphthalenedicarboxylic acid,
1,4-dibromo-5,8-dichloro-1,2,3,4,4a,5,8,8a-octahydro-5,8-methano-2,3-naphthalenedicarboxylic acid,
1,4,5,8-tetrabromo-1,2,3,4,4a,5,8,8a-octahydro-5,8-methano-2,3-naphthalenedicarboxylic acid,
1,4,-dibromo-5,6,7,8-tetrachloro-1,2,3,4,4a,5,8,8a-octahydro-5,8-methano-2,3-naphthalenedicarboxylic acid,
1,4-dibromo-5,6,7,8,9,9-hexachloro-1,2,3,4,4a,5,8,8a-octahydro-5,8-methano-2,3-naphthalenedicarboxylic acid,
1,4,5,6,7,8-hexabromo-1,2,3,4,4a,5,8,8a-octahydro-5,8-methano-2,3-naphthalenedicarboxylic acid,
1,4,5,6,7,8,9,9-octabromo-1,2,3,4,4a,5,8,8a-octahydro-5,8-methano-2,3-naphthalenedicarboxylic acid,
1,4,5,6,7,8,9,9-octachloro-4a,5,8,8a-tetrahydro-5,8-methano-2,3-naphthalenedicarboxylic acid, the corresponding polyiodo- and polyfluoro-substituted compounds, etc. It is to be understood that the aforementioned compounds are only representative of the class of compounds which may be prepared.

It is to be noted that the aforementioned compounds which constitute novel compositions of matter contain halogen atoms on the 1,4-position in the saturated ring of the compound. These two additional halogen atoms will enhance the value of the compound as a flame-retardant intermediate.

The compounds which constitute novel compositions of matter may be utilized as components of finished plastics or resins which, as hereinbefore set forth, possess the desired physical properties of being fire resistant and flame retardant. The monomers may be reacted with other compounds including glycols, such as ethylene glycol, propylene glycol, butylene glycol, diethylene glycol, dipropylene glycol; polyhydric phenols such as hydroquinone, catecho, resorcinol, etc.; amines such as ethylenediamine, propylene diamine, butylenediamine, hexamethylenediamine, meta-phenylenediamine, para-phenylenediamine, 1,3-cyclohexanediamine, 1,4 - cyclohexanediamine, diaminodiphenylmethane, diaminodicyclohexylmethane, etc.; dibasic acids or anhydrides thereof of both saturated and unsaturated nature such as maleic acid, maleic anhydride, fumaric acid, itaconic acid, citraconic acid, phthalic acid, phthalic anhydride, isophthalic acid, hexahydrophthalic anhydride, adipic acid, sebacic acid, etc.; unsaturated esters such as diallyl phthalate, diallyl isophthalate, diallyl maleate, etc.; and lactams, examples of which comprise butyrolactam, caprolactam, etc. It is also contemplated within the scope of this invention that the halo-substituted polyhydromethanonaphthalenedicarboxylic acids may be reacted with fatty acids or fatty acid oils such as linseed oil, soya oil, etc. and glycerols to form alkyd resins. The halo-substituted polyhydromethanonaphthalenedicarboxylic acid and the aforementioned compounds may be reacted in any known manner known in the art, the reaction conditions such as temperature and pressure being dependent upon the particular compounds undergoing condensation. For example, a halo-substituted polyhydromethanonaphthalenedicarboxylic acid may be reacted with a polyhydroxy compound, either aliphatic or aromatic in nature, examples of these compounds including glycols, hydroquinone, catechol, bis-phenol, etc., at temperatures ranging from about 50° to about 300° C. and for a residence time ranging from a few minutes up to about 24 hours to prepare polyesters. The polyesters thus prepared may comprise low molecular weight saturated compounds which can be utilized as molding resins, plasticizers, etc. In addition, low molecular weight unsaturated polyesters may be prepared which can then be epoxidized and used as stabilizing plasticizers for polyvinyl chloride resins. In addition, unsaturated polyesters prepared by the above addition of the acid with the glycol may be further reacted with vinyl monomers such as styrene to form compounds which are utilizable as thermo-setting resins. When the saturated low molecular weight polyester contains —OH terminals, the polyester may be admixed with a diisocyanate such as, for example, tolylene diisocyanate, diphenylmethane diisocyanate, polymethylene polyphenyl diisocyanate, to form polyurethane intermediates which may then be foamed by the addition of a foaming agent, said foaming agent being capable of liberating gaseous products when recting with the isocyanate. Examples of foaming agents which may be used include water, tertiary alcohols such as t-butyl alcohol, t-amyl alcohol, acids such as formic acid, polymethylol phenols and ureas, polycarboxylic acids, monocarboxylic acids and anhydrides thereof. The aforementioned condensations are effected at temperatures ranging from room temperature (25° C.) up to about 150° C. for a residence time also ranging from a few minutes up to about 10 hours or more.

In the event that aromatic dihydroxy compounds are admixed with the aforementioned acid, the resulting saturated low molecular weight polyester may be reacted with formaldehyde to form a resinous product. If the saturated polyester is of high molecular weight, that is, a molecular weight above 5,000 or more, the resulting product may be used as a molding resin.

The polyhydromethanonaphthalenedicarboxylic acids may also be reacted with amines to form polyamides. When the resulting polyamide is a low molecular weight compound, that is, a compound having a molecular weight of about 2,000 or less, the resulting resins may be used as adhesives, binders or inks, etc. If the resulting polyamide is a high molecular weight compound and comprises a polyamide linear polymer, the composition of matter may be used as a molding resin, or as a fiber or film former. In addition, the aforementioned acids may be admixed with an amine and a lactam to form fibrous material.

It is to be understood that the halogenated polyhydromethanonaphthalenedicarboxylic acid may be present in the finished reaction product in various concentrations, ranging from about 5% up to about 50% or more by weight of the finished product.

The following examples are given to illustrate the process of the present invention which, however, are not intended to limit the generally broad scope of the present invention in strict accordance therewith.

Example I

In this example 2 moles of maleic anhydride are dissolved in about 600 cc. of anhydrous ethyl ether at a temperature of about 30° C. Following this, 2 moles of furan are then added. The resulting pale yellow solution is allowed to stand for 16 hours, the product depositing out as well-formed crystals. The crystals comprising 3,6 - epoxy - 1,2,3,6 - tetrahydrophthalic anhydride are then separated from the solution.

The 3,6 - epoxy - 1,2,3,6 - tetrahydrophthalic anhydride, which is prepared according to the above paragraph, is then mixed with a molecular proportion of hexachlorocyclopentadiene in a xylene solvent. This mixture is heated to a temperature of about 150° C. and maintained thereat for a period of about 2 hours. At the end of this time the flask and contents thereof are allowed to cool to room temperature and the product is subjected to fractional crystallization. The desired product comprising 5,6,7,8,9,9 - hexachloro - 1,2,3,4,4a,5,8,8a-octahydro - 1,4 - epoxy - 5,8 - methano - 2,3 - naphthalenedicarboxylic acid anhydride is separated and recovered.

The acid anhydride which is prepared according to the above paragraph is then placed in a reaction vessel along with about 4 moles of hydrochloric acid. The mixture is heated to a temperature of about 100° C. for a period of about 8 hours. At the end of this time the vessel and contents thereof are allowed to cool to room temperature and the desired product comprising 1,4,5, 6,7,8,9,9 - octachloro - 1,2,3,4,4a,5,8,8a-octahydro - 5,8-methano - 2,3 - naphthalenedicarboxylic acid is separated and recovered by fractional crystallization.

Example II

To illustrate the preparation of the anhydride form of the desired compound, 2 moles of maleic anhydride are dissolved in about 600 cc. of anhydrous ethyl ether and thereafter 2 moles of furan are added to the mixture. As in Example I, the solution is allowed to stand for a period of 16 hours, the product comprising 3,6 - epoxy-1,2,3,6 - tetrahydrophthalic anhydride in the form of crystals are deposited out and separated from the solution.

The anhydride which is prepared according to the above paragraph is then admixed with a molecular proportion of hexachlorocyclopentadiene utilizing xylene as a solvent. The mixture is heated to a temperature of about 150° C. and maintained thereat for a period of about 4 hours. At the end of this time, the flask and contents thereof are allowed to cool to room temperature and the desired product comprising 5,6,7,8,9,9 - hexachloro - 1,2,3,4,4a,5,8,8a - octahydro - 1,4 - epoxy - 5,8-methano - 2,3 - naphthalenedicarboxylic acid anhydride is separated out and recovered.

The acid anhydride which is prepared according to the above paragraph is then dissolved in acetic anhydride and placed in a reaction vessel. The vessel is heated to a temperature of about 100° C. and anhydrous gaseous hydrogen chloride is charged to the vessel, the amount of said hydrogen chloride being in excess over the amount of anhydride present. At the end of 8 hours, the reaction vessel and contents thereof are allowed to return to room temperature. The excess pressure is vented and the desired product comprising 1,4,5,6,7,8,9,9 - octachloro - 1,2,3,4,4a,5,8,8a - octahydro - 5,8 - methano - 2,3 - naphthalenedicarboxylic anhydride is separated and recovered by fractional crystallization.

Example III

In this example 2 moles of maleic anhydride are dissolved in anhydrous ethyl ether and 2 moles of furan are added thereto. The solution is allowed to stand for a period of 16 hours, during which time crystals comprising 3,6 - epoxy - 1,2,3,6 - tetrahydrophthalic anhydride are formed. The crystals are separated from the mother liquor and purified by conventional means.

Equimolar proportions of the anhydride formed according to the above paragraph and hexabromocyclopentadiene are placed in a condensation flask along with xylene and heated to a temperature of about 150° C. The flask and contents thereof are maintained at a temperature range of from 150° to about 165° C. for a period of 6 hours. At the end of this time the flask and contents thereof are cooled to room temperature and the desired product comprising 5,6,7,8,9,9 - hexabromo - 1,4-epoxy - 5,8 - methano - 2,3 - naphthalenedicarboxylic acid anhydride is separated and recovered by fractional crystallization.

The anhydride formed according to the above paragraph is placed in a rection vessel along with about 4 moles of hydrobromic acid and treated in a manner similar to that set forth in Example I above. Upon completion of the desired residence time the product comprising 1,4,5,6,7,8,9,9 - octabromo - 1,2,3,4,4a,5,8,8a - octahydro - 5,8 - methano - 2,3 - naphthalenedicarboxylic acid is separated and recovered by fractional crystallization.

Example IV

An acid anhydride comprising 5,6,7,8,9,9 - hexachloro- 1,2,3,4,4a,5,8,8a - octahydro - 1,4 - epoxy - 5,8 - methano- 2,3 - naphthalenedicarboxylic acid anhydride which is prepared according to the process set forth in the first two paragraphs of Example I above is treated with hydrobromic acid at a temperature of about 100° C. Upon completion of the desired residence time the desired product comprising 1,4 - dibromo - 5,6,7,8,9,9 - hexachloro- 1,2,3,4,4a,5,8,8a - octahydro - 5,8 - methano - 2,3 - naphthalenedicarboxylic acid is separated and recovered by fractional crystallization.

Example V

A polyester resin which possesses excellent physical properties of flame retardancy is prepared by charging 0.5 mole of ethylene glycol and 0.5 mole of diethylene glycol to a flask. The flask is then swept with nitrogen and heated to a temperature between 90° and 100° C. Following this, an excess of 1,4,5,6,7,8,9,9-octachloro-1,2,3, 4,4a,5,8,8a-octahydro - 5,8 - methano-2,3-naphthalenedicarboxylic acid and 0.5 mole of maleic anhydride are added to the flask. The flask is then heated to a temperature of about 160° C. and maintained in a range of from about 165° to about 175° C. for a period of about 6 hours. At the end of the desired residence time the resin is recovered and separated from unreacted starting materials.

Example VI

A polyester resin is prepared from a mixture of 0.5 mole of propylene glycol and 0.8 mole of 1,4,5,6,7,8,9,9-octachloro - 1,2,3,4,4a,5,8,8a - octahydro - 5,8 - methano- 2,3-naphthalenedicarboxylic acid by charging the propylene glycol to a reaction vessel which is heated under a nitrogen blanket to about 120° C. and thereafter gradually charging the acid to the vessel while maintaining the temperature thereof at about 110° C. After addition of about two-thirds of the acid, the temperature of the flask is raised to about 145° C. and the remainder of the addition of the acid is completed. The flask and contents thereof are then heated to a temperature of about 160° C. and maintained thereat for a period of about 8 hours. Following this, about 0.5 mole of maleic anhydride is added to the reaction vessel and the esterification is allowed to proceed at a temperature of about 165° C. for an additional period of 8 hours. At the end of this time the resin is recovered by pouring the mixture onto aluminum foil. This resin will be light amber in color and will be ignited with difficulty when held in the flame of a Bunsen burner. In addition, the resin will be self-extinguishing as soon as it is removed from the direct flame.

If so desired, a mixture of styrene and hydroquinone may be preheated to a temperature in the range of from about 80° to about 100° C. in a flask equipped with a thermometer, stirrer and refluxing condenser. A portion of the resin which is prepared according to the above paragraph is added to the styrene while maintaining the temperature of the reaction vessel in a range of from about 80° to about 85° C. At the end of about 1.5 hours the resin will be fully dissolved in the styrene, which is then allowed to cool, the final resin being a clear solution.

Example VII

To illustrate the versatility of the products prepared according to the process of the present invention, alkyd resins may be prepared by admixing linseed oil, glycerol and a catalytic proportion of litharge in an alkylation flask. The flask is equipped with a reflux condenser, an electrical stirrer, nitrogen inlet tube, thermometer and a heating mantle. The mixture is heated and maintained at a temperature of about 170° to about 190° C. until transesterification occurs. Upon trans-esterification a portion of 1,4,5,6,7,8,9,9 - octachloro - 1,2,3,4,4a,5,8,8a-octahydro- 5,8-methano-2,3-naphthalenedicarboxylic acid is added and the desired temperature is maintained in a range of from about 230° to about 235° C. for a period of 2 hours. The resulting resin thus formed may be used as an intermediate in paints and varnishes to impart finishes to objects which have a high hardness and gloss and, in addition, are water and alkali resistant. Furthermore, the finishes will also have excellent flame-retarding properties. It is also contemplated that soya oil and soya fatty acid may be substituted for linseed oil as the fatty oil modifier.

When alkyd resins which are prepared according to this process utilizing the halo-substituted polyhydromethanonaphthalenedicarboxylic acid as one component thereof are compared with alkyd resins utilizing other acids or anhydrides such as phthalic anhydride or a bicyclo anhydride, it will be found that the drying time, hardness, fire retardance, etc. of the former alkyd resins will be much superior to those properties possessed by alkyd resins which do not contain the halo-substituted polyhydromethanonaphthalenedicarboxylic acid component.

Example VIII

Other plastics and resins may be prepared utilizing the products prepared according to the process of the present invention. For example, a polyurethane foam is prepared by admixing adipic acid, 1,4,5,6,7,8,9,9-octachloro-1,2,3, 4,4a,5,8,8a-octahydro - 5,8 - methano-2,3-naphthalenedicarboxylic acid and 1,2,6-hexanetriol in an alkylation flask. The mixture is placed under nitrogen and heated to a temperature of about 155° C. to about 175° C. for a period of about 3 hours. At the end of this time the water which evolves is removed and the mixture is admixed with toluene-2,4-diisocyanate. The mixture will become homogeneous and heat will evolve, foaming of the mixture beginning approximately 10 minutes after admixture. Following this, the sample is cured at a temperature of about 95° C. for a period of about 1 hour. The desired foam will comprise a rigid, white composite which will be self-extinguishing when removed from the direct contact with a flame.

Other plastics and resins may be prepared by admixing the 1,4,5,6,7,8,9,9-octachloro-1,2,3,4,4a,5,8,8a-octahydro-5,8-methano-2,3-naphthalenedicarboxylic acid with equimolar proportions of caprolactam and hexamethylenediamine, the resulting product being useful to form a tough fire resistant film. It is also possible to admix the acid with hexamethylenediamine in an organic solvent and polymerize the resulting mixture under polymerization conditions to form synthetic polyamides which are utilized to form fabrics.

In addition to the aforementioned plastics and resins, the novel compositions of matter of the present invention, comprising polyhalo-substituted polyhydromethaonaphthalenedicarboxylic acids or anhydride thereof in which at least two of the halogen substituents are positioned on the 1 and 4 carbon atoms in the saturated ring, may also be admixed with a polyolefin such as polypropylene. When strips of polypropylene containing from about 5 to about 50% by weight of the acids or anhydride of the present invention are submitted to a flammability test in an apparatus of the type described in the November 1966 issue of Modern Plastics, by C. P. Fenimore and J. F. Martin, it will be found that the oxygen index of the strips containing the acid or anhydride will be greater than strips of polypropylene which do not contain any additive. In addition, the rate of burning in air, as measured in seconds per inch, of the strips containing the acid or anhydride will be greater than that of strips which contain only polypropylene.

I claim as my invention:

1. A polyhalo-substituted polyhydromethanonaphthalenedicarboxylic acid or anhydride thereof having the formula:

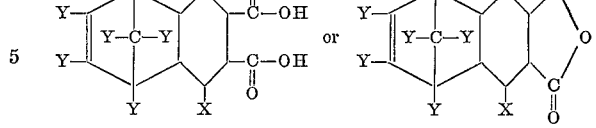

in which X is halogen and Y is hydrogen or halogen.

2. The polyhalo-substituted polyhydromethanonaphthalenedicarboxylic acid or anhydride thereof as set forth in claim 1 in which X is chlorine.

3. The polyhalo-substituted polyhydromethanonaphthalenedicarboxylic acid or anhydride thereof as set forth in claim 1 in which X is bromine.

4. The polyhalo-substituted polyhydromethanonaphthalenedicarboxylic acid or anhydride thereof as set forth in claim 1 in which Y is chlorine.

5. The polyhalo-substituted polyhydromethanonaphthalenedicarboxylic acid or anhydride thereof as set forth in claim 1 in which Y is bromine.

6. 1,4,5,6,7,8,9,9-octachloro-1,2,3,4,4a,5,8,8a-octahydro-5,8-methano-2,3-naphthalenedicarboxylic acid.

7. 1,4,5,6,7,8,9,9-octachloro-1,2,3,4,4a,5,8,8a-octahydro-5,8-methano-2,3-naphthalenedicarboxylic anhydride.

References Cited

UNITED STATES PATENTS 2,733,248   1/1956   Lidov _____ 260—346.6

ALEX MAZEL, Primary Examiner

BERNARD I. DENTZ, Assistant Examiner

U.S. Cl. X.R.

252—8.1; 260—2, 346.3, 514